US011170228B2

(12) United States Patent
Lu

(10) Patent No.: US 11,170,228 B2
(45) Date of Patent: Nov. 9, 2021

(54) ONE-DIMENSIONAL VEHICLE RANGING

(71) Applicant: HERE Global B.V., Eindhoven (NL)

(72) Inventor: Victor Lu, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 149 days.

(21) Appl. No.: 16/135,848

(22) Filed: Sep. 19, 2018

(65) Prior Publication Data

US 2020/0089968 A1 Mar. 19, 2020

(51) Int. Cl.
| | | |
|---|---|---|
| *G06K 9/00* | (2006.01) | |
| *G01S 17/42* | (2006.01) | |
| *G01S 17/89* | (2020.01) | |
| *G06T 7/77* | (2017.01) | |
| *G01S 17/04* | (2020.01) | |
| *G01S 17/931* | (2020.01) | |

(52) U.S. Cl.
CPC ......... *G06K 9/00791* (2013.01); *G01S 17/04* (2020.01); *G01S 17/42* (2013.01); *G01S 17/89* (2013.01); *G01S 17/931* (2020.01); *G06K 9/00201* (2013.01); *G06T 7/77* (2017.01); *G06T 2207/10028* (2013.01); *G06T 2207/20112* (2013.01); *G06T 2207/30261* (2013.01)

(58) Field of Classification Search
CPC ........... G06K 9/00791; G06K 9/00805; G06K 9/00201; G06T 7/77; G06T 2207/10028; G06T 2207/20112; G06T 2207/30261; G01S 17/931; G01S 17/04; G01S 17/42; G01S 17/89; G01S 7/4815; G01S 17/10; G01S 7/484; G01S 17/06; G01C 21/32; G06N 3/084; G06N 3/0445; G06N 20/00; G05D 1/0274
See application file for complete search history.

(56) References Cited

U.S. PATENT DOCUMENTS

| | | | |
|---|---|---|---|
| 5,477,459 A | 12/1995 | Clegg et al. | |
| 9,097,804 B1 * | 8/2015 | Silver | ................. B60W 40/076 |
| 9,208,609 B2 | 12/2015 | Taguchi et al. | |
| 9,739,881 B1 | 8/2017 | Pavek et al. | |
| 2017/0219695 A1 * | 8/2017 | Hall | ...................... G01S 7/4815 |
| 2019/0039633 A1 * | 2/2019 | Li | ....................... G06K 9/00791 |
| 2019/0147331 A1 * | 5/2019 | Arditi | ................... G01C 21/32 706/20 |

OTHER PUBLICATIONS

Stein, D., et al. "Rail detection using lidar sensors." International Journal of Sustainable Development and Planning 11.1 (2016): 65-78.

(Continued)

*Primary Examiner* — Jianxun Yang
(74) *Attorney, Agent, or Firm* — Lempia Summerfield Katz LLC

(57) ABSTRACT

A vehicle ranging system includes a ranging scanner, a ranging data processor, and an object classifier. The ranging scanner may be configured to generate a series of ranging data. The ranging data processor may be configured to apply a scale invariant ranging template to the series of ranging data and determine a difference between the ranging template and the series of ranging data. The object classifier may be configured to identify an object corresponding to the series of ranging data based on the difference between the ranging template and the series of ranging data.

17 Claims, 10 Drawing Sheets

(56) References Cited

OTHER PUBLICATIONS

Stein, Denis. Mobile laser scanning based determination of railway network topology and branching direction on turnouts. vol. 38. KIT Scientific Publishing, 2018.
"Lidar." Wikipedia, Wikimedia Foundation, Sep. 18, 2018, en.wikipedia.org/wiki/Lidar.

* cited by examiner

ONE-DIMENSIONAL VEHICLE RANGING

FIELD

The following disclosure relates to positioning, localization, and navigation for vehicle ranging.

BACKGROUND

A ranging system provides a series of measurements from the system to points in the environment. For example, a light detection and ranging (lidar) system provides a series of distance measurements at various angles around the system using a laser. Multiple measurements may be combined to form a point cloud that provides a three-dimensional distribution of the measurements in space. Ranging data points in the point cloud may be classified or segmented to identify objects in the environment around the ranging system.

A problem arises with classification of point cloud data to classify or segment objects in the environment because the ranging data points may be noisy or dense. For example, ranging data points belonging to one surface (e.g. a tree) may be located in close proximity to another surface (e.g. a wall), leading to inaccuracies in classification (e.g. ranging data points of the wall being classified as belonging to the tree). Furthermore, efficient retrieval of neighboring points may require first organizing the points into a spatial data structure, but constructing the spatial data structure may be resource intensive.

SUMMARY

In one embodiment, a vehicle ranging system includes a ranging scanner configured to generate a series of ranging data, a ranging data processor configured to receive a ranging template, apply the ranging template to the series of ranging data, and to determine a difference between the ranging template and the series of ranging data, and an object classifier configured to identify a spatial feature corresponding to the series of ranging data based on the difference between the ranging template and the series of ranging data.

In one embodiment, a method of vehicle ranging includes receiving a series of ranging data, receiving an object template, the object template being scale invariant, applying the object template to the series of ranging data, determining a difference between the object template and the series of ranging data, and classifying the series of ranging data based on the difference between the object template and the series of ranging data.

In one embodiment, a non-transitory computer readable medium including instructions that when executed by a process are operable to receive a series of ranging data, receive a statistical template, determine a statistical quantity of the series of ranging data, determine a difference between the statistical template and the statistical quantity of the series of ranging data, and classify the series of ranging data based on the difference between the statistical template and the statistical quantity of the series of ranging data.

In one embodiment, a ranging template system includes a ranging data interface configured to receive a series of ranging data, a sampler configured to identify a subset of the series of ranging data, a processor configured to associate an object with the subset of ranging data and generate a scale invariant ranging template based on the subset of ranging data and the object associated with the subset of ranging data, and a database configured to store the scale invariant ranging template.

In one embodiment, a method of developing a one-dimensional ranging template for vehicular ranging data includes receiving a series of ranging data, identifying a subset of ranging data of the series of ranging data, associating an object with the subset of ranging data, generating the one-dimensional ranging template based on the subset of ranging data and the object associated with the subset of ranging data, the one-dimensional ranging template being scale invariant, and storing the one-dimensional ranging template.

In one embodiment, a non-transitory computer-readable medium including instructions that when executed are operable to receive a series of ranging data, identify a subset of ranging data of the series of ranging data, associate an object with the subset of the series of ranging data, generate the statistical template based on the subset of ranging data, the object associated with the subset of ranging data, and the statistical quantity, and store the statistical template.

BRIEF DESCRIPTION OF THE DRAWINGS

Exemplary embodiments of the present invention are described herein with reference to the following drawings.

DETAILED DESCRIPTION

Figure 1:
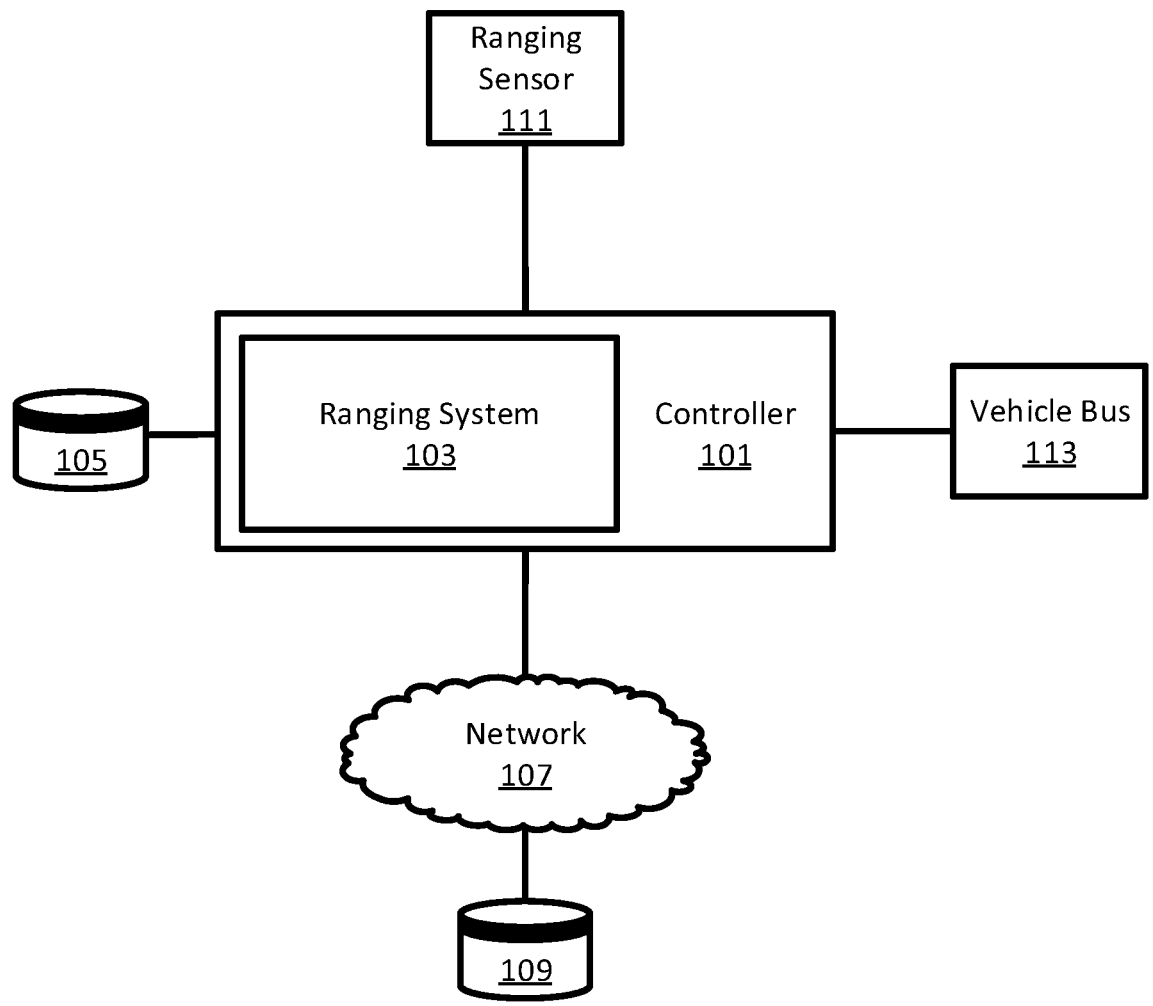
FIG. 1 illustrates an example system for vehicle ranging.

The following embodiments relate to several technological fields including but not limited to navigation, autonomous driving, assisted driving, traffic applications, and other location-based systems. The following embodiments achieve advantages in each of these technologies because ranging data may more readily be classified, segmented, or labeled in real time and without first organizing the ranging data into a point cloud or spatial data structure. In each of the technologies of navigation, autonomous driving, assisted driving, traffic applications, and other location-based systems, speed of classifying, segmenting, or labeling ranging data is increased. In addition, users of navigation, autonomous driving, assisted driving, traffic applications, and other location-based systems are more willing to adopt these systems given the technological advances in vehicle ranging.

To identify objects in the environment, data from the ranging system may be labelled, classified, or segmented. To classify a single point in the point cloud, an algorithm may perform an n-nearest neighbor search (e.g. looking at the nearest 2, 3, or more neighboring points). However, the neighboring points may belong to other structures and reduce the accuracy of the classification of the point. For example, the neighborhood of a point located on the wall of a building may contain points from a nearby tree or utility pole. Fitting a plane to the neighborhood of points may not accurately reflect an orientation of a surface of the building in this case.

Efficient searches of a neighborhood may require organizing the points into a spatial data structure (e.g. octree or k-d tree). The spatial data structure may facilitate the neighborhood search by excluding points that do not belong to the same subtree, leaf node, or other portion of the data structure as the point to be classified. However, constructing the spatial data structure may be time or resource intensive and challenging to perform in real-time as the ranging data is acquired.

Ranging systems may be provided on vehicles such as automobiles, drones, boats, or other vehicles. The ranging system may take distance measurements to points in the environment of the vehicle by emitting a light pulse and recording the time of flight for the light pulse to reflect back to the ranging system. The ranging system may determine a distance to the point in the environment based on the time of flight. The distance measurements in the order that the measurements were taken by the ranging system may be a series of ranging data. While determining a spatial data structure for the ranging data points may be time or resource intensive, the stream of ranging data points may be classified using a template. For example, building corners may appear as a "V" shape in the one-dimensional stream of ranging data points. The "V" shape of the corner of the building may have a local minimum at a point where the surface of the building has a derivative equal to zero with derivatives of opposite sign adjacent to the zero-derivative point. A pole may appear as a curve, similar to ellipse (e.g. a smooth curve with positive and negative derivatives adjacent to a point with a derivative equal to zero). A tree may appear as a noisy fluctuation. Templates adapted to the shape or other characteristics of objects represented by the ranging data points may identify such objects. By detecting three-dimensional geometric features within the one-dimensional sequence of ranging data points, classification, labelling, and segmentation may be performed without constructing the point cloud or the spatial data structure. Additionally, analyzing the one-dimensional ranging data may save time or resources as compared to processing the three-dimensional point cloud or spatial data structure and may allow for classification, segmentation, or labelling in real time as the sequence of ranging data is acquired. For example, because one-dimensional analysis may be less complex or resource intensive than three-dimensional point cloud analysis, the vehicle may use less power to analyze the ranging data. Additionally, less powerful computing devices may process the one-dimensional data because of the reduced complexity as compared to three-dimensional point cloud analysis.

FIG. 1 illustrates an example system for vehicle ranging. The system includes a controller 101 having a ranging system 103 in communication with a database 105 and a network 107 through which a database 109 is accessible. The controller may also be connected to a ranging sensor 111 and a vehicle bus 113. More or fewer components may be provided. For example, the controller 101 may not be connected to the database 105. In another example, the controller 101 is in communication with other sensors such as a positioning sensor or a speed sensor.

The controller 101 may interface or communicate with the database 105, the network 107, the ranging sensor 111, and the vehicle bus 113. The connection to the network 107 may be a cellular or other wireless or wired connection. Through the vehicle bus 113, the controller 101 may communicate with other systems of the vehicle such as a motor, brakes, steering, or other systems.

The controller 101 may be located on or implemented by a vehicle such as an automobile, a boat, a train, a helicopter, an airplane, a drone, an unmanned aerial vehicle ("UAV"), or another vehicle. In some cases, the controller 101 may be implemented by a computing device in communication with the vehicle. For example, the controller may be implemented on a server remote from the vehicle and in communication with the vehicle.

The ranging system 103 may be configured to receive ranging data from the ranging sensor 111. The ranging data may be a stream of measurements of distance, intensity, angle, or combinations of distance, intensity, and angle taken by the ranging sensor 111. The measurements in the ranging data may be in the form or order that the measurements are taken by the ranging sensor 111. The ranging system 103 may classify, segment, or label the ranging data by applying a template to the ranging data. When the template and the ranging data match, the ranging system may determine that the ranging data represents an object associated with the template. For example, where a template has been made from a sequence of distance measurements taken of a corner of a building, the ranging system 103 may apply the template to a stream of ranging data. A match between the ranging data and the template of the corner of the building may indicate that the ranging data represents a building corner in the environment around the vehicle. Based on the match or identification of the ranging data, the ranging system 103 or another system may provide further services, such as localization, positioning, map matching, navigation, autonomous driving, or other services. In one example, the ranging data is matched with a corner of a building and the ranging system 103 triggers a rich localization system to provide a piece of information to passengers in the vehicle. In another example, the identification of the building in the ranging data is used by the ranging system 103 to trigger an autonomous driving system to steer the vehicle away from the building or to stop or slow the vehicle.

The database 105 may receive and store the templates. For example, the ranging system may create or receive a template from the database 109 over the network 107 and send the template to the database 105 for storage. The database 105 may retrieve one or more templates for the ranging system to match with ranging data.

The ranging sensor 111 may be a lidar scanner or another sensor. The ranging sensor may measure a distance and an angle. For example, lidar scanners use a rotating mirror to deflect lasers in varying directions. Pulses of lasers may extend radially from the mirror of the lidar scanner. A series of one-dimensional lidar measurements may represent measurements taken as the mirror and laser pulses sweep radially through the environment. The distance to the nearest surface point along any given laser direction is obtained by firing a laser pulse and measuring its time-of-flight (e.g. the time elapsed between firing and returning to the mirror). The sequence of distance measurements obtained by a lidar scanner is thus the result of repeated distance measurements as the laser direction is varied. The lidar sensor may also measure a change in wavelength of the laser pulse from when the laser pulse was sent and when the pulse was received. Multiplying the time of flight by the speed of the laser pulse and dividing in half gives the distance from the lidar sensor to a surface that reflected the laser pulse. The measured angle may be an azimuth angle or a polar angle at which the laser pulse was sent or received by the lidar sensor.

The vehicle bus 113 may be the internal communications network for the vehicle. The vehicle bus 113 may facilitate communication between the controller 101 and an engine control unit, transmission control unit, anti-lock braking system, or one or more body control modules of the vehicle. The vehicle bus 113 may also communicate with other sensors of the vehicle, such as radar sensors, positioning sensors, and speed sensors. In some cases, the ranging sensor 111 may be connected to the bus and the controller 101 communicates with the ranging sensor 111 via the vehicle bus 113.

Figure 2:
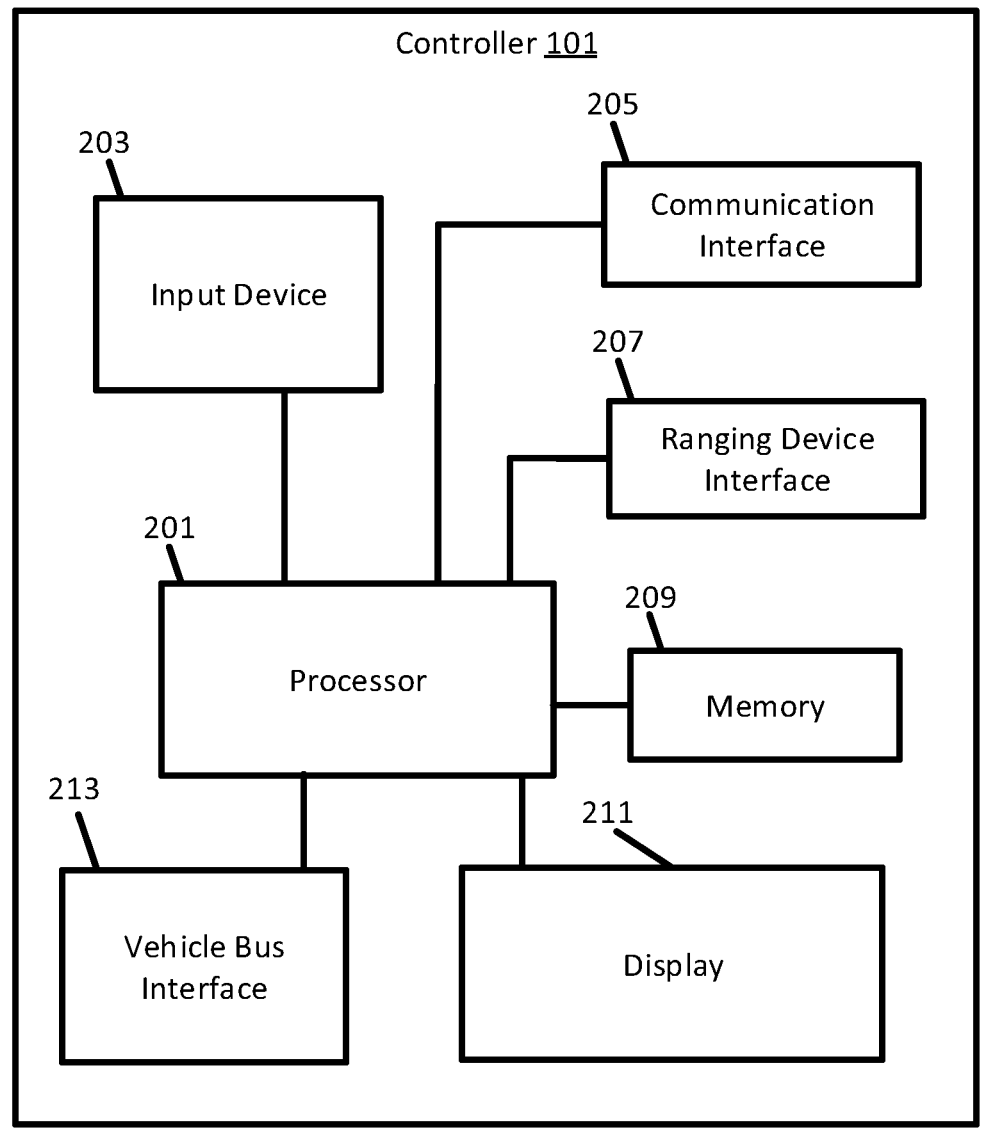
FIG. 2 illustrates an example controller for vehicle ranging.

FIG. 2 illustrates an example controller 101 for vehicle ranging. The controller may include a processor 201, an input device 203, a communication interface 205, a ranging device interface 207, a memory 209, a display 211, and a vehicle bus interface 213. Different or fewer components may be present. For example, the controller 101 may not have a display 211. In another example, the ranging device interface 207 is part of the communication interface 205. In a further example, the controller 101 includes positioning circuitry for establishing a position of the controller 101.

The processor 201 may be a general processor or application specific integrated circuit. In some cases, the processor 201 is or implements a ranging data processor or pre-processor. The processor 201 may retrieve instructions from the memory 209 and execute the instructions.

The input device 203 may be used for interacting with the controller 101 or to change settings of the controller 101. For example, the input device 203 may be used to specify a speed at which the ranging sensor 111 rotates. In another example, the input device 203 may be used to specify a frequency at which laser pulses are sent by the ranging sensor 111. In a further example, the input device 203 may be used to specify a minimum length of a template or sequence of ranging data points to be classified, segmented, or labeled.

The communication interface 205 may provide for the exchange of information between the controller and outside systems. For example, the communication interface 205 may be coupled with antennas for transmitting and receiving data. In some cases, the communication interface 205 forms a connection to the network 107. In this way, the communication interface 205 may allow for the exchange of data between the controller 101 and the database 109

The ranging device interface 207 may allow for the controller 101 to receive a sequence or stream of ranging measurement data from a ranging sensor. Additionally, the ranging device interface 207 may allow the controller 101 to send commands to the ranging device. In some cases, the ranging device interface may be part of or implemented by the communication interface 205 or the vehicle bus interface 213.

The memory 209 may be a volatile memory or a non-volatile memory. The memory 209 may include one or more of a read only memory (ROM), random access memory (RAM), a flash memory, an electronic erasable program read only memory (EEPROM), or other type of memory. The memory 209 may be removable from the DCP, such as a secure digital (SD) memory card. The memory 209 may store instructions to cause the processor 201 to implement the ranging system 103. The memory may be configured to store the series of ranging data and the ranging template.

The display 211 may be a liquid crystal display (LCD) panel, light emitting diode (LED) screen, thin film transistor screen, or another type of display. The output interface of the display 211 may also include audio capabilities, or speakers. The display 211 may indicate a status or other information about the controller 101 or the ranging sensor 111.

The vehicle bus interface 213 may provide a connection to the internal communications network for the vehicle. For example, the vehicle bus interface 213 may implement a connection between the controller 101 and the vehicle bus 113. The vehicle bus interface 213 may allow for the transfer of information between the controller 101 and one or more vehicle systems on the vehicle bus such as an engine control unit, transmission control unit, anti-lock braking system, or one or more body control modules of the vehicle.

The vehicle bus interface 213 may provide a piece of information based on a localization, positioning, map matching, navigation, or autonomous driving service. For example, a localization or positioning service may verify a position determined by a positioning device of the controller 101 or a vehicle or augment the accuracy of the positioning device. At a particular geographic location (e.g. indicated by the positioning device), there may be a record of an object in the immediate environment. The controller may recognize the object in the environment from the stream of ranging data using a ranging template and send, via the vehicle bus interface 213, a signal to the positioning device. Where the positioning device is part of or in direct communication with the controller 101, the controller 101 may send the verified or augmented position (e.g. the position plus a confidence value based on the identified object) to the vehicle using the vehicle bus interface 213. In some cases, the localization or positioning service is provided to a computing device remote to the controller 101. For example, the controller 101 may send the augmented position to a remote computing device over the network 107 using the communication interface 205. The navigation service may use the location and distance to a known object to navigate when another navigation system is not operable. For example, where the vehicle is a drone, a GPS positioning or navigation may be blocked by an 'urban canyon' formed by tall buildings around the drone. The navigation service may use distances to nearby buildings, waypoints, or beacons to navigate the drone.

In other cases, a map matching service may use an object corresponding to the series of ranging data to pick one of multiple plausible locations of the vehicle on a map as an actual location of the vehicle. The vehicle bus interface 213 may send the object corresponding to the stream of data or the actual location of the vehicle as determined by the map matching service to the vehicle. Additionally or alternatively, the object corresponding to the stream of data or the actual location of the vehicle as determined by the map matching service may be sent to a remote computer using the communication interface 205.

The controller 101 or a computing device remote from and in communication with the controller 101 may provide navigation or autonomous driving. For navigation, the controller 101 may use an object corresponding to the series of ranging data to plot a course toward or around the object. The vehicle bus interface 213 may communicate the course to the vehicle or the communication interface 205 may communicate the course to a remote computing device. Based on a position of the object stored in the object template or the course plotted by the navigation service, the controller 101 may generate one or more autonomous driving commands. For example, where a location of the object is identified in a current heading or path of the vehicle, the controller 101 may generate a throttle signal to reduce a throttle of the vehicle, a transmission signal to change a gear in the transmission of the vehicle, or a braking signal to apply a brake of the vehicle. The vehicle bus interface 213 may send the throttle signal to an engine control unit of the vehicle, the transmission signal to a transmission control unit of the vehicle, and the brake signal to an anti-lock braking system of the vehicle.

In still other cases, an information service may provide a piece of information based on, triggered by, or associated with an object of the ranging template matches to the series of ranging data. When there is a match between a ranging template and a series of ranging data, the controller 101 may send an indication of an object associated with the ranging template to the vehicle via the vehicle bus interface. Additionally or alternatively, the controller may send the object associated with the ranging template to a computer remote from but in communication with the vehicle or the controller 101 via the communication interface 205. The object associated with the ranging template may be used by an information service of the vehicle (or a remote computer) to provide a piece of information to the vehicle. For example, a warning may be presented to a passenger of the vehicle where the object represents a hazard. In another example, where the object represents a sign for a point of interest (e.g. a gas station, shop, café, or other attraction), the information service may present information about the point of interest. Based on a location of the object of the ranging template, the information service may present a piece of information for a tour. For example, the ranging template may have a location of the object or the ranging data may indicate a polar angle at which the series of ranging data was acquired that matched with the ranging template associated with the object. The information service may provide an instruction (e.g. "look to the right of the vehicle") so that occupants of the vehicle may observe the object or a point of interest.

Figure 3:
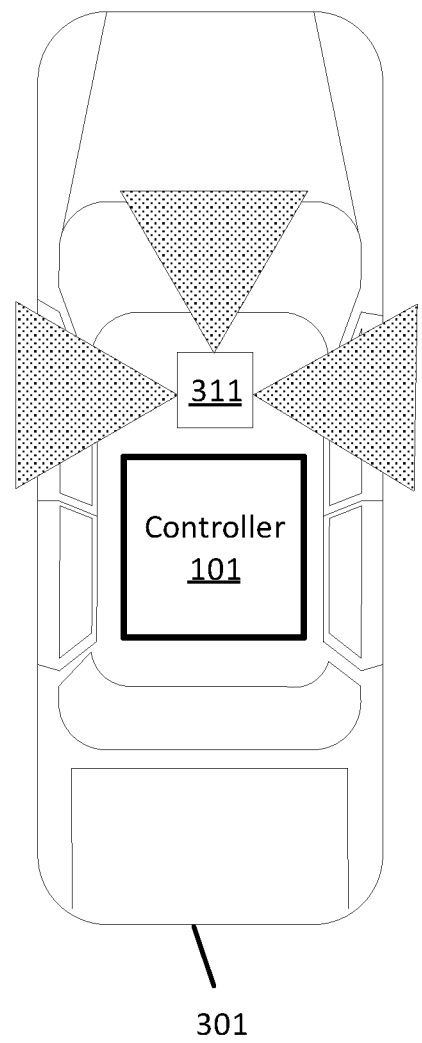
FIG. 3 illustrates an example vehicle with a ranging sensor.

FIG. 3 illustrates an example vehicle 301 with a ranging sensor 311. The vehicle 301 may also include the controller 101. The vehicle 301 may be an automobile, a boat, a train, a tram, a robot, a drone a UAV, an airplane, or another vehicle.

The ranging sensor 311 may be supported by the vehicle 301. For example, the ranging sensor 311 may be located on the top or front of the vehicle 301. The ranging sensor 311 may be arranged on the vehicle 301 so that the ranging sensor 311 has a wide view of the environment around the vehicle 301. A field of view of the ranging sensor 311 may extend fully or partially around the vehicle 301. A portion of the field of view of the ranging sensor 311 is shown as the dotted area extending to the sides and in front of the vehicle 301.

The ranging sensor 311 may sweep over the field of view by rotating. For example, the ranging sensor 311 may rotate in a clockwise or counter-clockwise direction. While stationary or while rotating, the ranging sensor 311 may output one or more laser pulses into the environment and measure a time of flight for the one or more pulses to be reflected back to the ranging sensor 311. The time of flight may be used to calculate the distance that each laser pulse traveled, and the distance from one or more surfaces (e.g. reflection surfaces) in the environment of the vehicle 301 to the ranging sensor 311. Taken together, measurements of distances between the ranging sensor 311 and surfaces in the environment may form a one-dimensional series of ranging data. The series may be one dimensional because each measurement contains information about the distance without reference to a three-dimensional position of the reflection surface in a point cloud or spatial data structure.

A series, sequence, or stream of distance measurements may be transmitted to the controller 101 from the ranging sensor 311. The series, sequence, or stream of distance measurements may be sent to the controller 101 as the measurements are acquired by the ranging sensor 311.

Figure 4:
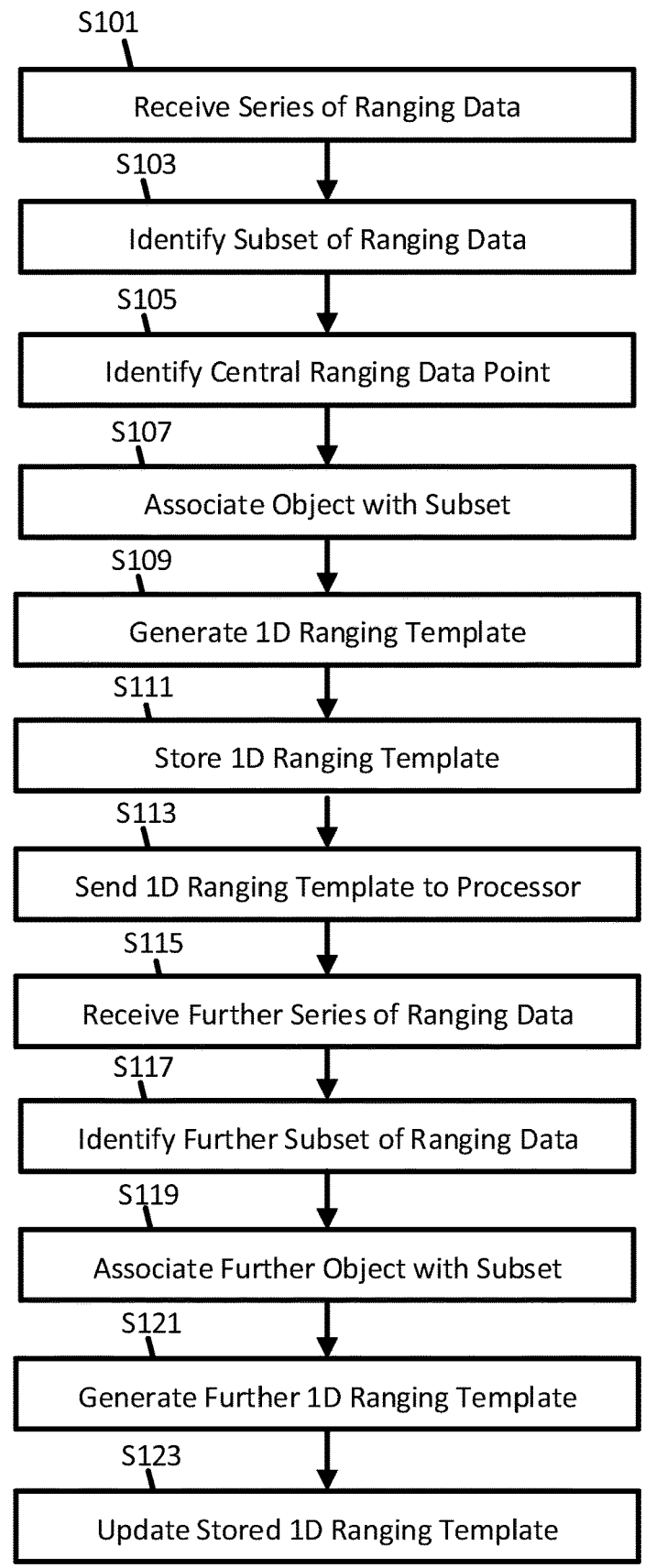
FIG. 4 illustrates a flow chart for developing a one-dimensional ranging template for vehicular ranging data.

FIG. 4 illustrates a flow chart for developing a one-dimensional ranging template for vehicular ranging data. More, fewer, or different acts may be provided. For example, step S103 may be omitted. The acts may be performed in any order. For example, act S105 may follow from act S107. A processor may perform the acts. For example, the acts may be performed by a processor of the controller 101 of FIG. 2. In another example, the controller 101 or a computing device remote to the controller 101 of FIG. 1 performs the acts.

In act S101, a series of ranging data is received. A ranging sensor may produce the ranging data. For example, the ranging data may be measurements from a lidar device. The ranging data may be a series or sequence of one or more measurements of a distance or one or more angles. In some cases, the ranging data includes a distance measurement and a measurement of a polar angle or an azimuth angle. The series or sequence of ranging data may be in an order in which the measurements were acquired by the ranging sensor. The series of ranging data may be a first series of ranging data.

In act S103, a subset of the ranging data is identified. The subset may span all or less than all of the ranging data points in the series of ranging data received. In some cases, ranging measurements that are significantly longer than other ranging measurements may be excluded from the subset. For example, where the time of flight exceeds a maximum limit, the ranging measurement may be excluded. In this way, the series of ranging data may be trimmed such that only relevant ranging data points are included in the subset (and in a template made from the subset). The subset of ranging data may be a first subset of the first ranging data.

In act S105, a central ranging data point is identified. The central ranging data point may be a distance measurement that is in the middle of the series of ranging data or the subset of ranging data used to generate the ranging template. Where there are an even number of ranging data points in the series of ranging data or in the subset, there may be more than one candidate for the central ranging data point. In some cases, the central ranging data point may have a distance value that is a combination of more than one distance measurement. For example, for a series or subset of four ranging data points, the central ranging data point may have a distance value that is an average of the distance measurement of the middle two ranging data points. The central ranging data point may be used to scale the distance measurements or distance function in the ranging data template.

In act S107, an object or spatial feature is associated with the ranging data. In some cases, the object is associated with the subset of the ranging data. The object or spatial feature may be a road feature or an environmental feature. For example, the road feature may be an edge or boundary of the road (such as a guardrail or divider), a road marker (such as a sign), a lane marker, or another piece of road infrastructure. In another example, the environmental feature may be a corner or other portion of a building, a pole, a transmission line, another vehicle, or another object present in the environment around the vehicle. The object may be a first object associated with the first ranging data.

In act S109, a one-dimensional ranging template is generated based on the ranging data and the object associated with the ranging data. In some cases, the template is generated based on the subset of ranging data. The template may be a series or sequence of one or more distances labeled with the object associated with the ranging data. In some cases, the template may include one or more of a measurement of an azimuth angle and a polar angle. Additionally or alternatively, the template may contain a function that corresponds to the distance measurements of the ranging data or the subset of the ranging data. In some cases, the function may be a continuous or discrete function that approximates or models the series or sequence of distance measurements or angles in the ranging data or the subset of ranging data. The one-dimensional ranging template may be a first one-dimensional ranging template.

In some cases, the template may be scale invariant. A scale invariant template may be compared to other series or sequences of ranging data that were taken at a larger or smaller distance to the object, and for different sized objects. For example, the scale invariant template may be applied to a sequence of example ranging data that was taken at a closer distance to the object. While the absolute value of the distance measurements in the template may be significantly larger than the distance measurements in the example ranging data, the template may still match with the example ranging data if the relative proportion of the template matches the proportion of the distance measurements in the example ranging data. Additionally or alternatively, the ranging template may be made scale invariant by being normalized or scaled by the central ranging point.

In some other cases, generating the one-dimensional ranging template may involve determining a statistical quantity of the subset of the ranging data. The statistical quantity may be calculated as a variance, a measure of fluctuation, a range, a mean, a median, a quantile, a maximum, or a minimum of the subset of the ranging data. The one-dimensional ranging template including the statistical quantity may be a statistical template. A statistical template may include more than one statistical quantity. The statistical template may be generated based on the subset of ranging data, the object associated with the subset of ranging data, and the statistical quantity.

In act S111, the one-dimensional ranging template is stored. The ranging template may be stored in a database. For example, the ranging template may be stored in the database 105 of the database 109 of FIG. 1. Where the ranging template is created by a computing device external to the controller or ranging system, the ranging template may be sent to the controller or ranging system through the network. The ranging templates may be sent to the controller or ranging system when available or in batches of one or more ranging templates.

In act S113, the one-dimensional ranging template may be sent to a ranging data processor. For example, a computing device or the ranging template system 501 of FIG. 5 that may generate the one-dimensional ranging template may be remote from and in communication with a controller, computing device, or ranging data processor that may use the ranging template to classify, label, or segment a series of one-dimensional ranging data. The ranging processor may be the ranging data processor 707 of FIG. 7. The ranging data processor may use the ranging data template to classify, segment, or label a further series of ranging data.

In act S115, a second series of ranging data may be received. The second series of ranging data may be distance, intensity, or angle measurements from a ranging sensor in the order the measurements are taken. The second series of ranging data may be received from the same ranging sensor or a different ranging sensor as the first series of ranging data received in act S101.

In act S117, a second subset of ranging data is identified from the second series of ranging data. The second subset may be identified as the first subset was identified in act S103 above. The second subset may contain all or less than all of the distance measurements of the second series of ranging data.

In act S119, a second object may be associated with the second subset of ranging data or the second series of ranging data. The second object may be the same or different from the first object associated with the first ranging template in act S107. For example, the second object may be associated with or represent the same building as the first object associated with the first ranging template In act S121, a second one-dimensional ranging template is generated. The second one-dimensional template may be generated based on the second subset of ranging data and the second object.

The second ranging template may be generated similar to how the first ranging template is generated in act S109. The second raging data template may be generated when the second object corresponds to the first object. For example, where the second object is the same as the first object (e.g. where both are a corner of a building), a single template may apply to both the series of ranging data and the second series of ranging data.

In act S123, the stored one-dimensional ranging template is updated based on the second one-dimensional ranging template. Updating may include modifying the ranging template to include information from the second ranging template. For example, the ranging template may be updated to include the second series of ranging data included in the second ranging template. In some cases, the surface of an object may change over time and the series of ranging data that identifies the object may be updated. For example, a renovation on a building may change the outer surface of the building. While the object remains the same (e.g. the building name, location, or other information may not have changed between the object and the second object describing the building), a second data set that is more recent may more accurately reflect the actual or present surface of the building. In this way an old ranging template with an outdated subset of ranging data points or an outdated function describing a surface of the building may be updated with the second template based on a second subset of ranging data taken from a second series of ranging data.

Figure 5:
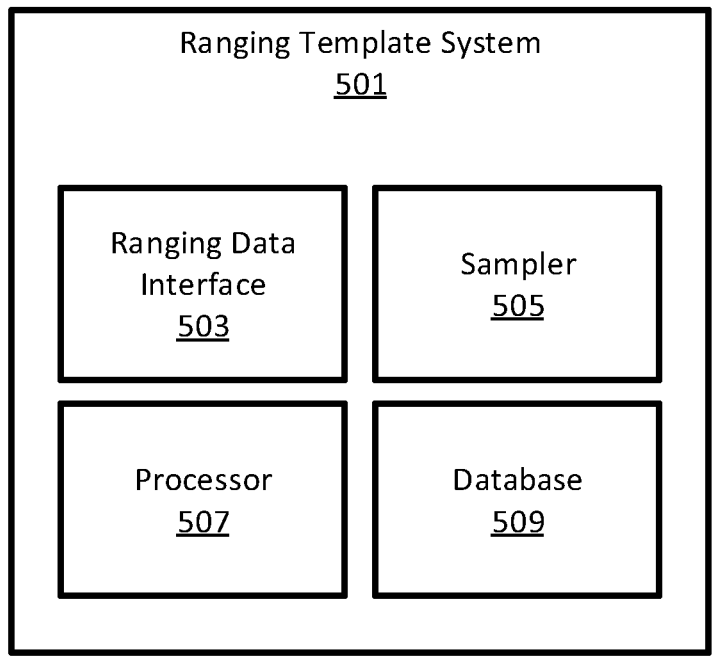
FIG. 5 illustrates an example ranging template system.

FIG. 5 illustrates an example ranging template system 501. The ranging template system may include a ranging data interface 503, a sampler 505, a processor 507, and a database 509. More, different, or fewer components may be provided. For example, the ranging data interface 503 may be part of another communication interface such as the communication interface 205 or the vehicle bus interface 213 of FIG. 2.

The ranging template system 501 may be implemented by the controller 101 of FIG. 1 or by a computing device remote to the controller 101. The ranging template system 401 may be configured to implement one or more acts of FIG. 4.

The ranging data interface 503 may include or be implemented by a receiver and a transmitter. The ranging data interface 503 may be configured for digital or analog communication with one or more ranging data sensors. The ranging data interface 503 may include one or more amplifiers, digital to analog converters, or analog to digital converters.

The ranging data interface 503 may be configured to receive a series of ranging data. The ranging data interface 503 may be configured to receive the series of ranging data from a ranging scanner. For example, the ranging data interface 503 may be configured to receive the series of ranging data from a lidar device. The series of ranging data may be a one-dimensional series of measurements of a distance or an angle from a scan of the ranging scanner. The measurement of the angle may be a measurement of an azimuth angle or a polar angle. The ranging data interface may be configured to receive further series of ranging data from the same or a different ranging scanner.

The sampler 505 may be implemented as a register that stores and releases all or less than all of the ranging data points of the series of ranging data points. The sampler may be configured to identify a subset of the series of ranging data points. In some cases, the subset may be chosen from the series of ranging data points based on a maximum distance threshold over which a data point of the series of ranging data points will be excluded from the subset. Data points of the series of ranging data that have a distance below the maximum threshold may be included in the subset. In other cases, the subset is defined by a maximum width. For example, the subset may have a width of 3, 4, 5, or more or fewer data points of the series of ranging data. The sampler 505 may be configured to identify further subsets from further series of ranging data.

The processor 507 may be a general processor or an application specific integrated circuit. The processor 507 may be the processor 201 of the controller 101. Additionally or alternatively, the processor may be a processor of a computing device remote from and in communication with the controller 101.

The processor 507 may be configured to associate an object with the subset of ranging data and generate a scale invariant ranging template based on the subset of ranging data and the object associated with the subset of ranging data. The scale invariant ranging template may be independent of a spatial data structure. For example, the scale invariant ranging template may not be a part of or refer to a point cloud of ranging data points or a spatial data structure of the point cloud. In this way the template may allow for analysis of ranging data as the data is acquired by a ranging sensor without first organizing the ranging data into a point cloud or a spatial data structure of the point cloud. The scale invariant ranging template may be a one-dimensional series of one or more measurements of a distance or an angle. Additionally or alternatively, the scale invariant ranging template may include a function that describes a surface defined by the one or more measurements of a distance, intensity, or angle.

The scale invariant ranging template may be generated similar to the way that the one-dimensional ranging template is generated in act S109 of FIG. 4. The processor 507 may be configured to associate further objects with further subsets of ranging data and to generate further scale invariant ranging templates based on the further objects and the further subsets of ranging data.

The processor 507 may be configured to identify a central ranging data point of the data points included in the scale invariant ranging template. The scale invariant ranging template may be scaled by the central ranging data point. For example, the scale invariant ranging template is scaled by the central ranging data point so that each of the distance measurements included in the ranging template is a proportion of the value of the distance measurement to the value of the distance of the central ranging data point. In this way, the scale invariant ranging template may apply to any scale of ranging data because the scale invariant ranging template uses normalized distance measurements that are scaled by the central ranging data point. A scale invariant ranging template may replace one or more scale-dependent ranging templates.

The database 509 may be implemented by or form part of the memory 209 of the controller 101. Additionally or alternatively, the database 509 may be implemented by or form part of a memory of a computing device remote from and in communication with the controller 101. In some cases, the database 509 may be the database 105 or the database 109. The database 509 may be configured to store the scale invariant ranging template. The database 509 may be configured to send the scale invariant ranging template to the controller 101 or to the ranging system 103 of the controller 101. The database 509 may be configured to update the stored scale invariant ranging template based on a further scale invariant ranging template.

Figure 6:
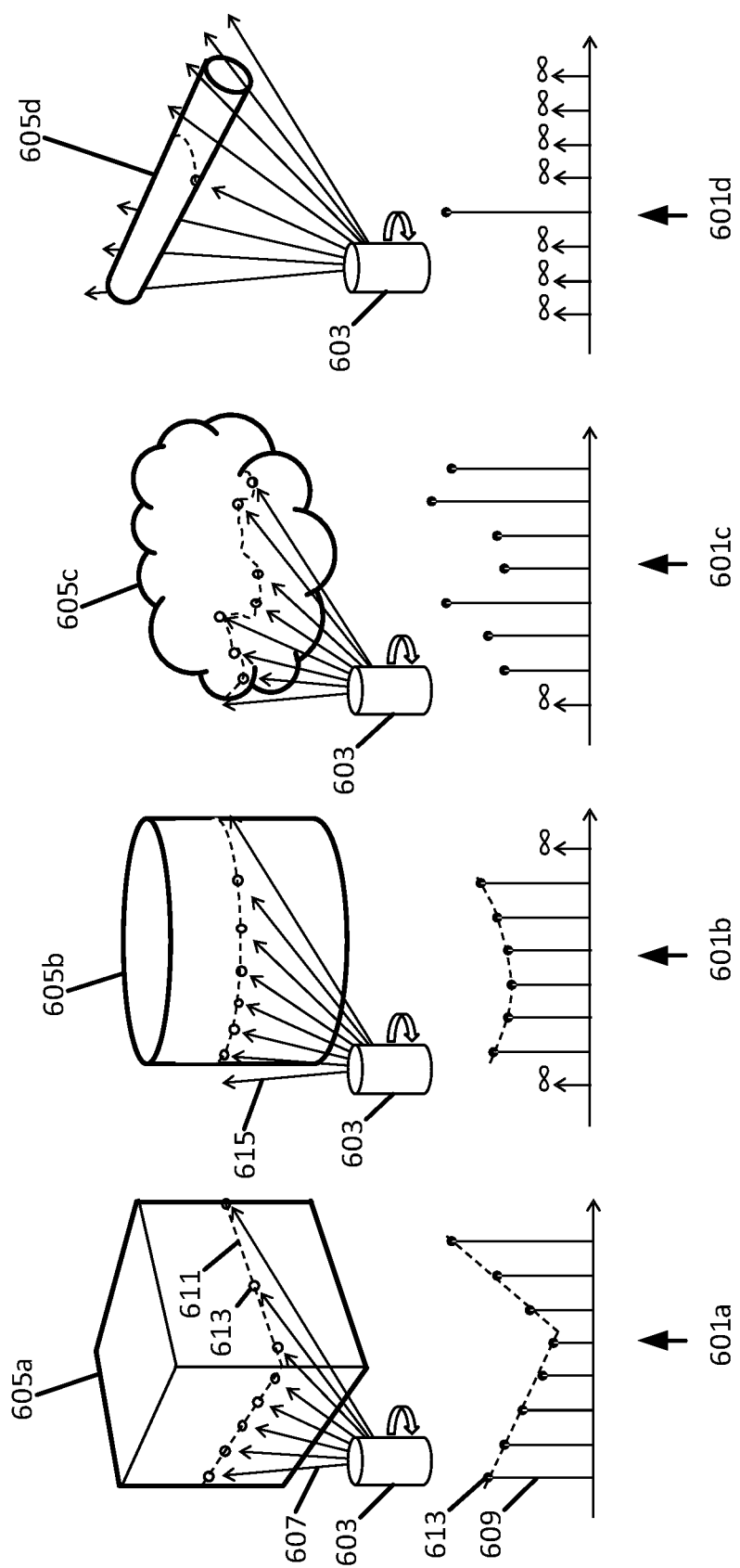
FIG. 6 illustrates ranging data and ranging templates.

FIG. 6 illustrates ranging data and ranging templates. One-dimensional series of distance measurements 601a, 601b, 601c, 601d represent distance measurements made by a ranging sensor 603 of a distance between the ranging sensor 603 and an object. The object 605 may be a corner of a building 605a, a pole 605b, a plant or tree 605c, or a transmission line 605d.

The one-dimensional series of distance measurements 601a is collected by the ranging sensor 603 at a distance 607 from the object 605a. The distance 607 is graphically represented as a vertical line 609 in the one-dimensional series 601a. The ranging sensor 603 may trace a path 611 along the surface of the object 605a. Along the path 611 the ranging sensor 603 may collect distance measurements 607 at points 613 where a light or laser pulse reflects off the object 605a.

The profile of the corner of the building 605a forms a distinctive "V" shape of decreasing and then increasing distances 609 that may be integrated into a ranging template. Additionally, the surface of the pole 605b may form a partial ellipse in the series of distance measurements 601b that may be integrated into a template.

The surface of the tree 605c may change frequently and the series of distance measurements 601c may have a large variance. Instead of incorporating a profile of the surface into a template, a statistical quantity may be determined for a surface of the tree 605c that may be integrated into a template. For example, the statistical quantity may be a variance, a measure of fluctuation, a range, a mean, a median, a quantile, a maximum, or a minimum. Similar to how the "V" shape and the partial ellipse describe the surface of other objects 605a, 605b, the statistical quantity may describe the surface of a tree.

Other shapes may represent other objects. For example, a series of ranging data points having a shape with a constant derivative (e.g. resembling a flat surface) may represent or correspond to a road sign. In another example, a series of ranging data points having a valley between two peaks (e.g. two local maxima separated by a local minimum) may represent or correspond to a guardrail. In a further example, a series of ranging data having a derivative with a local maximum at a point with a derivative equal to zero with derivatives of opposite sign adjacent to the local maximum may represent or correspond to a part or edge of a vehicle (e.g. the transition from the hood to the side of the vehicle). The ranging data representing the corner of the building may be distinguished from ranging data representing a portion of a car because the building may have a sharp corner (e.g.

non-smooth transition from a negative to a positive slope in the derivative) whereas the car may have a more sloping or gentle edge (e.g. a smooth transition from a negative slope of a derivative to a positive slope).

The ranging sensor may output a light pulse that is not reflected back to the ranging sensor at all or within a period of time. For example, light pulse 615 does not reflect off of the surface of the pole 605*b*. In another example, the light pulse 615 may reflect back to the ranging sensor only after an extended period of time or reflect with an intensity that is below a detection threshold. The ranging sensor may mark the distance measured by the light pulse 615 as being infinite. A series of infinite light pulses with a defined distance measurement interrupting the series may be indicative of a distance measurement of a transmission line 605*d*.

Figure 7:
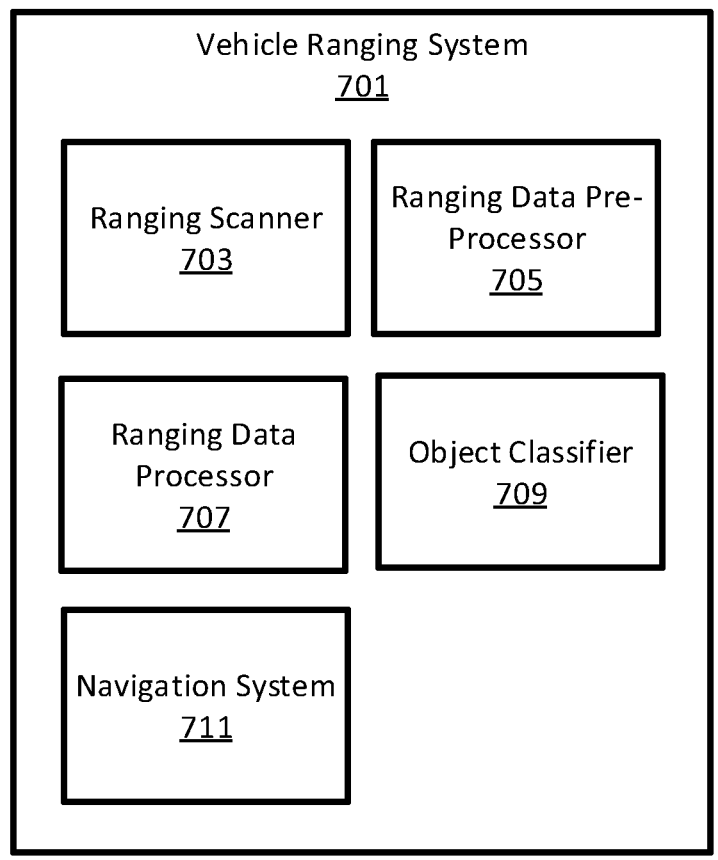
FIG. 7 illustrates an example vehicle ranging system.

FIG. 7 illustrates an example vehicle ranging system 701 having a ranging scanner 703, a ranging data preprocessor 705, a ranging data processor 707, an object classifier 709, and a navigation system 711. More, fewer, or different components may be included in the vehicle ranging system. For example, the preprocessor 705 may be part of the ranging data processor 707. In another example, the navigation system may be absent. The vehicle ranging system 701 may be a component of or implemented by the controller 101. Additionally or alternatively, the vehicle ranging system may be implemented by or a part of a computing device that is remote to and in communication with the controller 101.

The ranging scanner 703 may be a lidar device. The ranging scanner 703 may be configured to generate a series of ranging data. The series of ranging data may be a one-dimensional series of one or more measurements of a distance, an angle, or an intensity from a scan of the ranging scanner 703. For example, a measurement of an angle may be a measurement of the azimuth angle or polar angle at which a light pulse was emitted from the ranging scanner 703 or at which a reflected light pulse was received at the ranging scanner 703. The ranging scanner 703 may be configured to generate the series of ranging data in real time. In some cases, the series of ranging data is generated without organizing the ranging data into a three-dimensional point cloud or into a spatial data structure.

The ranging data pre-processor 705 may be an application specific integrated circuit. The ranging data pre-processor 705 may be configured to normalize the series of ranging data and the ranging template. In some cases, the ranging template will be normalized as stored and further normalization may not be performed on the ranging template. The pre-processor may be configured to identify a central ranging data point of the series of ranging data and a central template point of the ranging template. In some cases, normalization may involve scaling the series of ranging data by the central ranging data point and the ranging template by the central template data point. Normalization may produce normalized ranging data and a normalized ranging template by normalizing the distance measurements in the series of ranging data and the ranging template. For example, the series of ranging data may have distance measurements in units of distance (e.g. feet, meters), but the normalized ranging data may have distance measurements in an unitless proportion to the central ranging data point (e.g. a first distance measurement is twice as large as the distance measurement of the central ranging data point). The normalized ranging template may also store distance measurements or a distance function in relative or proportion to the central template data point.

The ranging data processor 707 may be an application specific integrated circuit. The ranging data processor 707 may be configured to receive a ranging template and apply the template to the series of ranging data. The ranging template or the series of ranging data may be normalized. The ranging template may be scale invariant. For example, the ranging template may be based on template ranging data that is taken at a further or nearer distance than the ranging data. The ranging template may be a one-dimensional series of one or more measurements of a distance or an angle. In some cases, the ranging template may be a statistical template and the series of ranging data may include a statistical measure of the ranging data. The ranging template may correspond to a road feature. For example, the ranging template may correspond to a portion of a building (e.g. a corner), a pole, a tree, a transmission line, a sign, a road boundary, or another feature.

The ranging data processor may be configured to determine a difference or similarity between the series of ranging data and the ranging template. The difference may be determined in real time or as the series of ranging data is recorded, measured, or otherwise produced by the ranging sensor 111 or the ranging scanner 703. The ranging data processor may compare or contrast the series of ranging data and the ranging template using the formula:

$$\sum_{k=-r}^{r} \left( \frac{h[k]}{h[0]} - \frac{x[i+k]}{x[i]} \right)^2 \qquad \text{Eq. (1)}$$

Where h is the series of distance measurements or the distance function of the ranging template, h[k] is the distance at a point k in the ranging template, h[0] is the distance at the central template data point, r is a half-width of the template, x is the series of ranging data, x[i] is a distance measurement at a current point in the series of ranging data, and x[i+k] is a distance measurement k measurements away from the current point in the series of ranging data. By summing from k=−r to k=r, the ranging template is compared to the series of ranging data in a sliding window fashion. Because h[k] is divided by h[0], the formula may normalize or scale the distance measurements in the ranging template by the central template data point. Similarly, r ranging data points ahead of and behind the current point in the series of ranging data are normalized by the value of the current distance measurement, x[i]. The output of the function is a measure of the difference between the ranging template and the series of ranging data. Put another way, the function quantifies a correspondence between the ranging template and the series of ranging data. Perfect correspondence (or no difference) between the ranging template may result in a low or zero value output by the function. Low correspondence (or a high difference) between the ranging template and the series of ranging data may result in a positive value output by the function. The output of the function may be applied to a threshold. A value below the threshold may mean that the ranging template and the series of ranging data match and represent the same object. A value at or above the threshold may indicate that the ranging template is not a match for the series of ranging data. In some cases, a different ranging template may be applied to the series of ranging data where a first template does not match the series of ranging data. Additionally or alternatively, a plurality of templates may be applied to the series of ranging data. The template with the smallest difference with the ranging data may be identified. The template of the plurality having the lowest difference may be chosen as a match representing the same object as the series of ranging data.

The object classifier 709 may be configured to identify a spatial feature corresponding to the series of ranging data. In some cases, the spatial feature may be identified as a spatial feature, object, or road feature corresponding to the ranging template. For example, where the difference between the ranging template and the series of ranging indicated a match (e.g. the value of the function is below the threshold), a spatial feature associated with the ranging template may be identified as a spatial feature corresponding to the series of ranging data. The spatial feature may be a portion of a building, a pole, a tree, a transmission line, a road marker, a sign, a road barrier, or another object. In some cases, multiple templates may be applied to a series of ranging data, and the template with the smallest difference with the data is identified.

The navigation system 711 may be configured to generate a driving command or a position of the vehicle based on the spatial feature. For example, where the object classifier 709 indicates that the series of ranging data corresponds to a building, the navigation system 711 may produce a driving command to cause the vehicle to navigate around the building. In another example, the object classifier 709 may identify a spatial feature that is a point of interest for the vehicle. The driving command may suggest a course to the vehicle to approach the point of interest. In a further example, the object classifier identifies a spatial feature that corresponds to the series of ranging data and has a location. The navigation system may generate a position of the vehicle as being near the known location of the identified spatial feature. The position may indicate that the vehicle is within a radius of the spatial feature based on one or more distance measurements in the series of ranging data.

Figure 8:
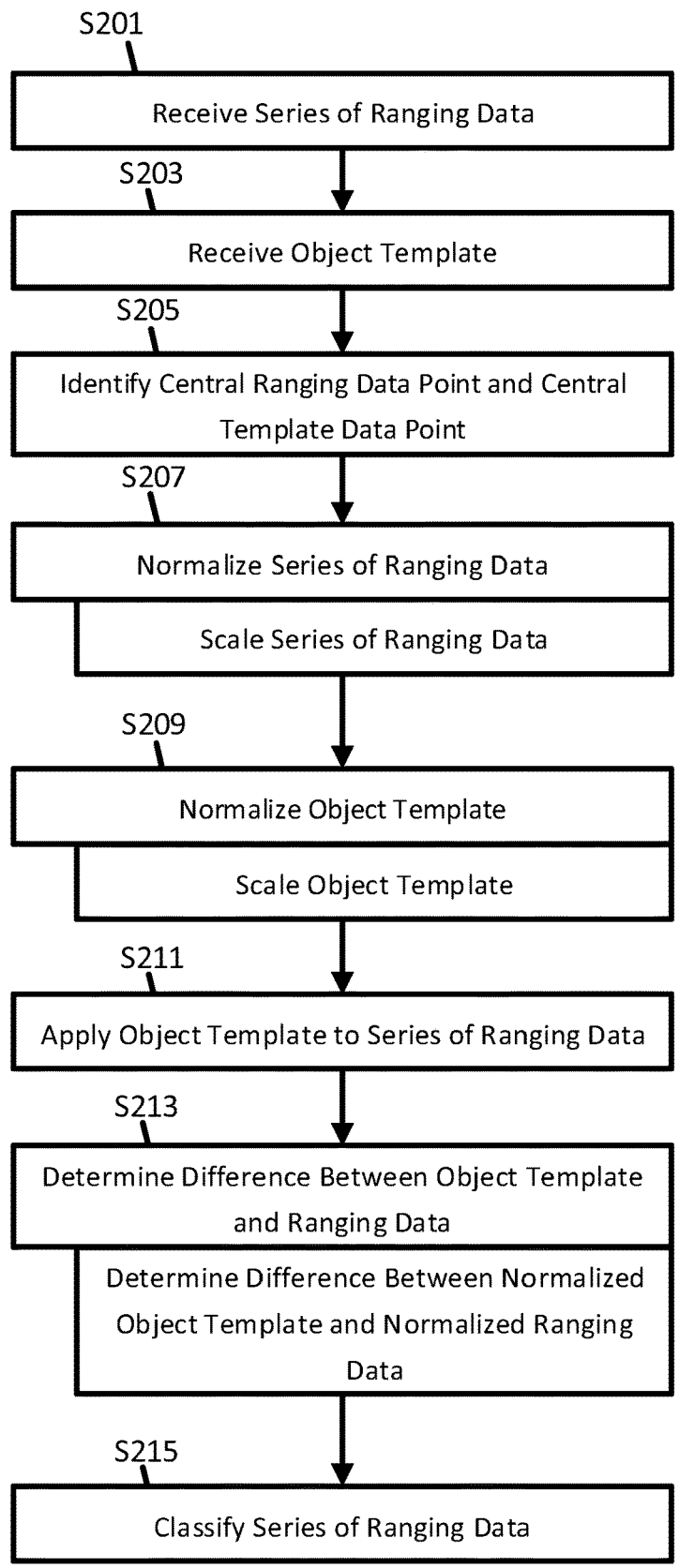
FIG. 8 illustrates a flow chart for vehicle ranging.

FIG. 8 illustrates a flow chart for vehicle ranging. The acts may be performed in any order. For example, act S201 may follow from act S203. More, different, or fewer acts may be present. For example, acts S207 and S209 may be omitted. In another example, acts S205, S207, and S209 are part of Act S211.

In act S201, a series of ranging data is received. The series of ranging data may be produced by a ranging scanner or sensor such as a lidar device. The series of ranging data may be received as the ranging data is collected, measured, or produced by the lidar device. In some cases, the series of ranging data may be received in real time. The series of ranging data may be received before the series of ranging data is organized into a point cloud or a spatial data structure.

The series of ranging data may be a sequence of one or more measurements of a distance or an angle. The measurement of an angle may be a measurement of an azimuth angle or a polar angle at which a light pulse was emitted by the lidar device to measure a distance. The series of ranging data may include distance measurements in the order in which the distance measurements were recorded, measured, or collected by the lidar device.

In act S203, an object template may be received. The object template may be a sequence of one or more measurements of a distance or an angle. The measurement of an angle may be a measurement of an azimuth angle or a polar angle associated with a distance measurement. In some cases, the object template may include a tag, label, or other connection or correspondence to a road object or other object. The road object may be a portion (e.g. a corner) of a structure or a pole. In some other cases, the object template may include a position of a location of the object represented by the template. For example, where the object is a portion of a building, the object template may contain a location of the building or the portion of the building (e.g. in geographic coordinates). The object template may have a width defined by a number of distance measurements contained by the object template. A width of the series of ranging data may be matched or the same as the width of the object template. In some cases, the object template may be scale invariant. For example, the object template may be applied to multiple series of ranging data at different distances from the object.

In some cases, the object template may be a statistical template. The statistical template may include a statistical quantity. The statistical quantity may be a variance, a measure of fluctuation, a range, a mean, a median, a quantile, a maximum, or a minimum.

In act S205, a central ranging data point of the series of raging data is determined. The central ranging data point may be a middle or most-central data measurement in the sequence of data measurements of the series of ranging data. For example, for a series of ranging data having three distance measurements, the second distance measurement in the series or sequence of distance measurements may be determined to be the central ranging data point. Additionally or alternatively, a central template data point of the object template may be determined. The central template data point may be a middle data measurement of the series of data measurements included in the object template.

In act S207, the series of ranging data is normalized by the central ranging data point. Normalizing may involve scaling or dividing the distance measurements in the series of ranging data by the central ranging data point. Once normalized, the series of ranging data becomes a normalized series of ranging data. The distance measurements in the normalized series of ranging data may be unitless or expressed as a fraction of the distance measurement of the central ranging data point.

In act S209, the object template is normalized by the central template data point. Normalizing may involve scaling or dividing the distance measurements in the object template by the central template data point. Once normalized, the object template becomes a normalized object template. The distance measurements in the normalized object template may be unitless or expressed as a fraction of the distance measurement of the central template data point.

In act S211, the object template is applied to the series of ranging data. The application may involve comparing the object template and the series of ranging data. In some cases, the normalized object template is applied to the normalized series of ranging data.

In some cases, applying the object template to the series of ranging data may include determining a statistical quantity of the series of ranging data. The statistical quantity of the ranging data may be a variance, a measure of fluctuation, a range, a mean, a median, a quantile, a maximum, or a minimum. Where the object template includes one or more particular statistical quantities, the one or more statistical quantities of the object template may be calculated for the series of ranging data. For example, where an object template is a statistical template including a variance, a measure of fluctuation, and a range, one or more statistical quantities may be calculated for the series of ranging data that are a variance, a measure of fluctuation, or a range.

In act S213, a difference between the object template and the series of ranging data is determined. For example, the formula in equation (1) above may be used to determine a measure of a similarity or a difference between the object template and the series of ranging data. The measure of similarity or difference between the object template and the series of ranging data may be applied to a threshold. In some cases, the difference or similarity may be determined between a normalized set of ranging data and a normalized object template.

In some cases, a difference between the object template and the series of ranging data may be determined by comparing one or more statistical quantities of the object template to one or more statistical quantities determined for the series of ranging data. For example, the difference may be determined as a sum or average of a subtraction or division of one or more statistical quantities of the object template and one or more statistical quantities of the series of ranging data. The average may be a weighted average. In act S215, the series of ranging data is classified based on the difference or similarity between the object template and the series of ranging data. In some cases, the series of ranging data may be classified based on a difference between one or more statistical quantities of the object template and one or more statistical quantities of the series of ranging data. Where the measure of a difference between the object template and the series of ranging data is below the threshold (or where the measure of similarity is above the threshold), the series of ranging data may be labeled or classified as representing the road object associated with the object template.

Figure 9:
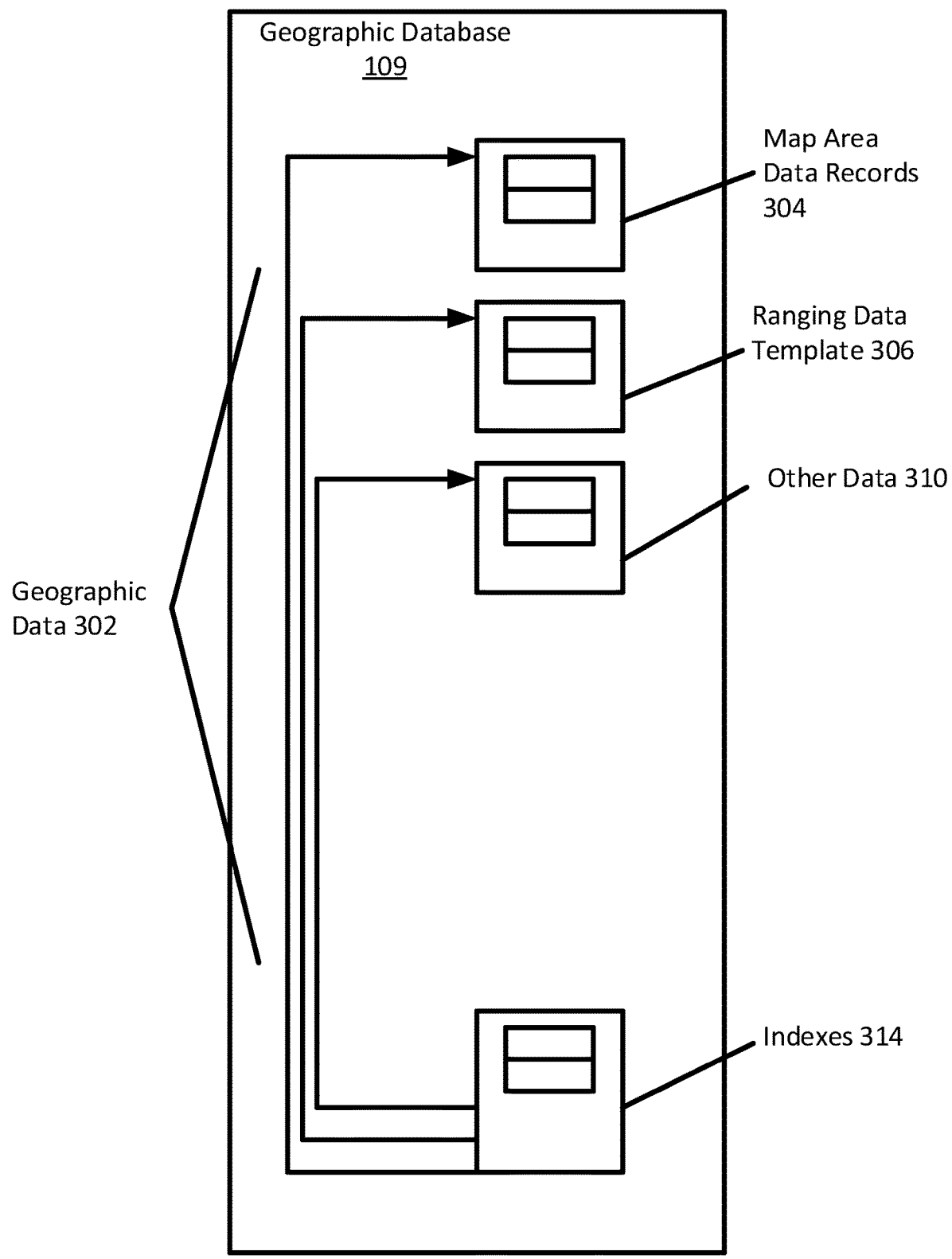
FIGS. 9 and 10 illustrate example geographic databases.

In FIG. 9, the geographic database 109 may contain at least one map area data record 304 (also referred to as "entity" or "entry") for each map area in a particular geographic region. The geographic database 109 may also include a ranging data template 306 (or "entity" or "entry") for each node in a particular geographic region. The terms "nodes" and "areas" represent only one terminology for describing these physical geographic features, and other terminology for describing these features is intended to be encompassed within the scope of these concepts. The geographic database 109 may also include location fingerprint data for specific locations in a particular geographic region.

The geographic database 109 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 109 also includes indexes 314. The indexes 314 may include various types of indexes that relate the different types of data to each other or that relate to other aspects of the data contained in the geographic database 109. For example, the indexes 314 may relate the nodes of the ranging data templates 306 with the end points of a map area in the map area data records 304.

The geographic database 109 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the map area includes a highway or toll way, the location of stop signs and/or stoplights in the map area), as well as POIs, such as gasoline stations, hotels, restaurants, museums, stadiums, offices, automobile dealerships, auto repair shops, buildings, stores, parks, municipal facilities, other businesses, etc. The geographic database 109 may also contain one or more ranging data template(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 109 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 109 may include historical traffic speed data for one or more map area. The geographic database 109 may also include traffic attributes for one or more map area. A traffic attribute may indicate that a map area has a high probability of traffic congestion.

Figure 10:
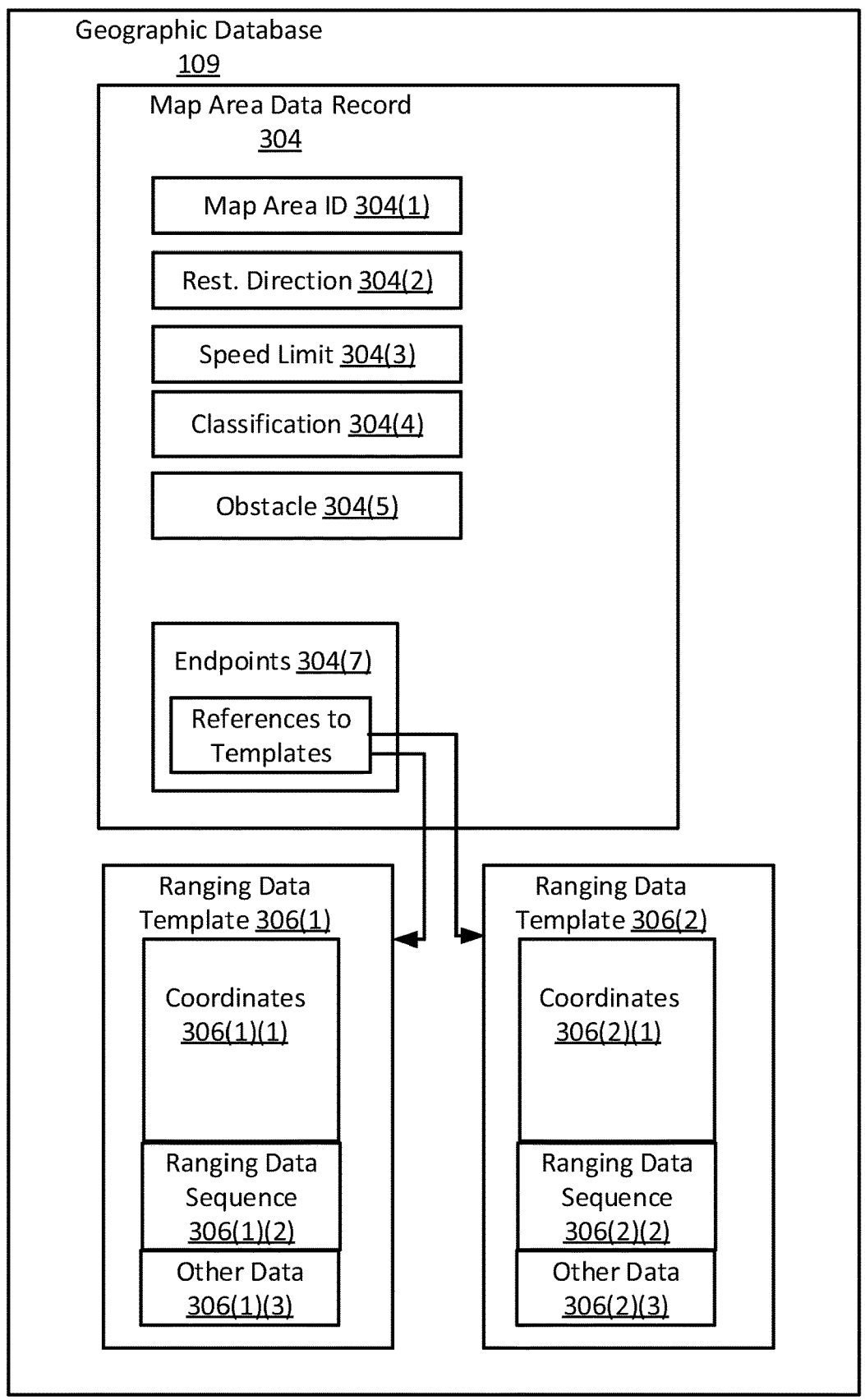

FIG. 10 shows some of the components of a map area data record 304 contained in the geographic database 109 according to one embodiment. The map area data record 304 may include a map area ID 304(1) by which the data record can be identified in the geographic database 109. Each map area data record 304 may have associated with it information (such as "attributes", "fields", etc.) that describes features of the represented map area. The map area data record 304 may include data 304(2) that indicate the restrictions, if any, on the direction of vehicular travel permitted in the represented map area. The map area data record 304 may include data 304(3) that indicate a speed limit or speed category (i.e., the maximum permitted vehicular speed of travel) in the represented map area. The map area data record 304 may also include classification data 304(4) indicating whether the represented map area includes a controlled access road (such as an expressway), a ramp to a controlled access road, a bridge, a tunnel, a toll road, a ferry, and so on. The map area data record 304 may include location fingerprint data, for example a set of sensor data for a particular location.

The geographic database 109 may include map area data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects may be stored using categories such as low, medium, or high. Additional schema may be used to describe the road objects. The attribute data may be stored in relation to a map area 304, a node 306, a strand of links, a location fingerprint, an area, or a region. The geographic database 109 may store information or settings for display preferences. The geographic database 109 may be coupled to a display. The display may be configured to display the roadway network and data entities using different colors or schemes.

The map area data record 304 also includes data 304(7) providing the geographic coordinates (e.g., the latitude and longitude) of the end points of the represented map area. In one embodiment, the data 304(7) are references to the ranging data templates 306 of nodes corresponding to the end points of the represented map area.

The map area data record 304 may also include or be associated with other data 304(7) that refer to various other attributes of the represented map area. The various attributes associated with a map area may be included in a single map area record or may be included in more than one type of record which cross-references to each other. For example, the map area data record 304 may include data identifying what turn restrictions exist at each of the nodes which correspond to intersections in the map area, the name, or names by which the represented map area is identified, the street address ranges in the represented map area, and so on.

FIG. 10 also shows some of the components of a ranging data template 306 that may be contained in the geographic database 109. Each of the ranging data templates 306 may have associated information (such as "attributes", "fields", etc.) that allows identification of the map area (s) that connect to it and/or its geographic position (e.g., its latitude and longitude coordinates). The ranging data templates 306(1) and 306(2) may include the latitude and longitude coordinates 306(1)(1) and 306(2)(1) of a node, including ranging data sequence 306 (1)(2), which may include the original geographic coordinates for the ranging data sequence 306(2)(2), which may include the ranging data that is associated with the template after one or more of techniques described herein are performed. The ranging data sequence 306 (1)(2) and the ranging data sequence 306(2)(2) may change dynamically or over time as links are removed from the map data that describe the ranging data. The ranging data templates 306(1) and 306(2) may also include other data 306(1)(3) and 306(2)(3) that refer to various other attributes of the nodes.

The geographic database 109 may be maintained by a content provider (e.g., a map developer). By way of example, the map developer may collect geographic data to generate and enhance the geographic database 109. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used.

The geographic database 109 and the data stored within the geographic database 109 may be licensed or delivered on-demand. Other navigational services or traffic server providers may access the location fingerprint data, traffic data and/or the lane line object data stored in the geographic database 109.

The processor 201 and/or processor 507 may include a general processor, digital signal processor, an application specific integrated circuit (ASIC), field programmable gate array (FPGA), analog circuit, digital circuit, combinations thereof, or other now known or later developed processor. The processor 201 and/or processor 507 may be a single device or combinations of devices, such as associated with a network, distributed processing, or cloud computing.

The memory 209 may be a volatile memory or a non-volatile memory. The memory 209 may include one or more of a read only memory (ROM), random access memory (RAM), a flash memory, an electronic erasable program read only memory (EEPROM), or other type of memory. The memory 209 may be removable from the controller 101, such as a secure digital (SD) memory card.

The communication interface 205 may include any operable connection. An operable connection may be one in which signals, physical communications, and/or logical communications may be sent and/or received. An operable connection may include a physical interface, an electrical interface, and/or a data interface. The communication interface 205 provides for wireless and/or wired communications in any now known or later developed format.

The databases 109 may include geographic data used for traffic and/or navigation-related applications. The geographic data may include data representing a road network or system including map area data and node data. The map area data may include road segments and node data representing the ends or intersections of the roads. The map area data including the node data may indicate the location of the roads and intersections as well as various attributes of the roads and intersections. Other formats than map areas and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the map areas includes a highway or toll way, the location of stop signs and/or stoplights in the map areas), as well as points of interest (POIs), such as gasoline stations, hotels, restaurants, museums, stadiums, offices, automobile dealerships, auto repair shops, buildings, stores, parks, etc. The databases may also contain one or more ranging data template(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more map areas s. The databases may also include traffic attributes for one or more map areas. A traffic attribute may indicate that a map area has a high probability of traffic congestion.

The input device 203 may be one or more buttons, keypad, keyboard, mouse, stylus pen, trackball, rocker switch, touch pad, voice recognition circuit, or other device or component for inputting data to the controller 101. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The navigation system 711 may include suitable sensing devices that measure the traveling distance, speed, direction, and so on, of the vehicle 301. The navigation system 711 may also include a receiver and correlation chip to obtain a GPS signal. Alternatively or additionally, the one or more detectors or sensors may include an accelerometer and/or a magnetic sensor built or embedded into or within the interior of the vehicle 301. The accelerometer is operable to detect, recognize, or measure the rate of change of translational and/or rotational movement of the vehicle 301. The magnetic sensor, or a compass, is configured to generate data indicative of a heading of the vehicle 301. Data from the accelerometer and the magnetic sensor may indicate orientation of the vehicle 301. The vehicle 301 receives location data from the navigation system 711. The location data indicates the location of the vehicle 301.

The navigation system 711 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The navigation system 711 may include suitable sensing devices that measure the traveling distance, speed, direction, and so on, of the vehicle 301. The navigation system 711 may also include a receiver and correlation chip to obtain a GPS signal.

The navigation system 711 may also include gyroscopes, accelerometers, magnetometers, or any other device for tracking or determining movement of a vehicle. The gyroscope is operable to detect, recognize, or measure the current orientation, or changes in orientation, of a vehicle. Gyroscope orientation change detection may operate as a measure of yaw, pitch, or roll of the vehicle.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor (s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A vehicle ranging system comprising:
    a ranging scanner configured to generate a series of ranging data;
    a ranging data processor configured to:
        receive one or more ranging templates associated with a spatial feature;
        normalize the one or more ranging templates by a central template data point to generate a normalized ranging template;
        apply the normalized ranging template to the series of ranging data generated by the ranging scanner to determine a difference between the normalized ranging template and the series of ranging data; and
        identify, by an object classifier, the series of ranging data as being associated with the spatial feature based on the difference between the normalized ranging template and the series of ranging data,
            wherein the series of ranging data is a one-dimensional series of one or more measurements of a distance, intensity, or an angle from a scan of the ranging scanner, and
            wherein the normalized ranging template is a one-dimensional series of one or more measurements of a distance, intensity, or an angle.

2. The system of claim 1, wherein the normalized ranging template is scale invariant.

3. The system of claim 1, wherein the one or more ranging templates corresponds to a geographic or road feature.

4. The system of claim 1, further comprising:
    a navigation system configured to generate a driving command, or a position of the vehicle based on the spatial feature.

5. The system of claim 1, wherein the ranging data processor is further configured to compare the difference between the normalized ranging template and the series of ranging data to a threshold, and
    wherein the object classifier is further configured to identify the spatial feature corresponding to the series of ranging data as the spatial feature corresponding to the normalized ranging template when the difference is below the threshold.

6. The system of claim 1, wherein the ranging data processor is configured to:
    normalize the series of ranging data by a central ranging data point to produce normalized ranging data,
    wherein the ranging data processor is further configured to determine a difference between the normalized ranging template and the normalized ranging data.

7. The system of claim 6, wherein the ranging data processor is further configured to scale the series of ranging data by the central ranging data point and scale the one or more ranging templates by the central template data point.

8. The system of claim 1, wherein the ranging data processor is configured to process the series of ranging data in real time.

9. A method of vehicle ranging, the method comprising:
    receiving, by a processor, a series of ranging data that is one-dimensional;
    receiving, by the processor, one or more object templates, the object template being scale invariant;
    normalizing, by the processor, the one or more object templates by a central template data point to generate a normalized object template;
    applying, by the processor, the normalized object template to the series of ranging data;
    determining, by the processor, a difference between the normalized object template and the series of ranging data; and
    classifying, by the processor, the series of ranging data as being associated with the object based on the difference between the normalized object template and the series of ranging data,
        wherein the series of ranging data is a sequence of one or more measurements of a distance, intensity, or an angle as measured by a ranging device, and
        wherein the normalized object template is a one-dimensional sequence of one or more measurements of a distance, intensity, or an angle.

10. The method of claim 9, wherein the series of ranging data is produced by a light detection and ranging (lidar) device of the vehicle.

11. The method of claim 10, wherein the series of ranging data is received by the processor in real time as the lidar device produces the series of ranging data.

12. The method of claim 9, wherein a width of the series of ranging data is matched to a width of the normalized object template.

13. The method of claim 9, wherein the one or more object templates corresponds to a corner of a structure or a pole.

14. The method of claim 9, further comprising:
    comparing, by the processor, the difference between the normalized object template and the series of ranging data to a threshold,
    wherein the series of ranging data is classified as corresponding to the corner of the structure or the pole when the difference is below the threshold, or when the difference is less than that of all other normalized object templates.

15. The method of claim 9, further comprising:
    identifying, by the processor, a central ranging data point of the series of ranging data;
    normalizing, by the processor, the series of ranging data by the central ranging data point, the normalizing of the series of ranging data producing normalized ranging data; and
    determining, by the processor, a difference between the normalized object template and the normalized ranging data.

16. The method of claim 15, further comprising:
    scaling, by the processor, the series of ranging data by the central ranging data point; and
    scaling, by the processor, the one or more object templates by the central template data point.

17. A non-transitory computer-readable medium including instructions that when executed are operable to:
    receive, by a processor, a series of one-dimensional ranging data;
    receive, by the processor, one or more statistical templates associated with an object;
    normalize, by the processor, the one or more statistical templates by a central template data point to generate a normalized statistical template;
    determine, by the processor, a statistical quantity of the series of ranging data;
    determine, by the processor, a difference between the normalized statistical template and the statistical quantity of the series of ranging data; and classify, by the processor, the series of ranging data as being associated with the object based on the difference between the normalized statistical template and the statistical quantity of the series of ranging data,
    wherein the statistical quantity is a variance, a measure of fluctuation, a range, a mean, a median, a quantile, a maximum, or a minimum of the series of ranging data, and
    wherein the normalized statistical template comprises one or more of a variance, a measure of fluctuation, a range, a mean, a median, a quantile, a maximum, or a minimum corresponding to the object.

* * * * *